(12) United States Patent
Cardin

(10) Patent No.: US 11,691,659 B1
(45) Date of Patent: Jul. 4, 2023

(54) WAGON AND CATAPULT ASSEMBLY

(71) Applicant: Eric Ray Cardin, Medford, OR (US)

(72) Inventor: Eric Ray Cardin, Medford, OR (US)

( * ) Notice: Subject to any disclaimer, the term of this patent is extended or adjusted under 35 U.S.C. 154(b) by 36 days.

(21) Appl. No.: 17/529,377

(22) Filed: Nov. 18, 2021

Related U.S. Application Data

(60) Provisional application No. 63/176,957, filed on Apr. 20, 2021.

(51) Int. Cl.
*B62B 3/10* (2006.01)
*B62B 3/02* (2006.01)
*F41B 3/02* (2006.01)
*B62B 3/00* (2006.01)
*B62B 5/06* (2006.01)

(52) U.S. Cl.
CPC ............... *B62B 3/10* (2013.01); *B62B 3/003* (2013.01); *B62B 3/007* (2013.01); *B62B 3/02* (2013.01); *B62B 5/064* (2013.01); *F41B 3/02* (2013.01); *B62B 2202/41* (2013.01)

(58) Field of Classification Search
CPC .......... B62B 3/10; B62B 3/003; B62B 3/007; B62B 3/02; B62B 5/064; F41B 3/02
USPC ............................ 280/87.01, 87.043, 87.051
See application file for complete search history.

(56) References Cited

U.S. PATENT DOCUMENTS

| | | | |
|---|---|---|---|
| 651,658 A | 6/1900 | Flindall | |
| 1,223,949 A | 4/1917 | Flagg | |
| 1,313,470 A * | 8/1919 | Discher | B62B 3/007 280/7.17 |
| 2,414,244 A * | 1/1947 | Roth | B62B 19/02 280/87.01 |
| 2,430,685 A * | 11/1947 | Pearson | F41B 3/02 124/16 |
| 2,464,868 A * | 3/1949 | Jost | B62B 13/18 280/87.01 |
| 3,116,935 A * | 1/1964 | Mitchin | B62K 9/00 280/87.01 |
| 3,256,873 A * | 6/1966 | George | F41B 7/003 124/34 |
| 3,318,612 A * | 5/1967 | Kuhn | A63H 33/04 297/DIG. 2 |
| 4,198,949 A * | 4/1980 | Cook | F41B 3/02 33/263 |
| 4,505,495 A * | 3/1985 | Foss | B62B 3/02 16/113.1 |
| 4,922,884 A | 5/1990 | Ford | |

(Continued)

*Primary Examiner* — Frank B Vanaman
(74) *Attorney, Agent, or Firm* — Jerry Haynes Law

(57) ABSTRACT

A wagon and catapult assembly provides a toy wagon that carries a detachable catapult. Assembly allows children to ride and operate the toy wagon, and also operate the catapult in a prone/sitting position, or while standing. The assembly comprises a toy wagon and a detachable catapult portion attached to the wagon. The toy wagon comprises mobile portion attached to a body portion to enable mobility of wagon. The body portion is foldable. Further the body portion has one or more fixed rear sidewalls and one or more detachable front sidewalls. The front sidewalls have a pair of leg depressions that enable the child to sit in a prone position while operating catapult and/or riding the toy wagon. An elongated handle pivotally and detachably attaches to the wagon for manipulating it and providing stability while operating the catapult. A seat detachably couples to the wagon.

13 Claims, 4 Drawing Sheets

(56) References Cited

U.S. PATENT DOCUMENTS

| | | | | |
|---|---|---|---|---|
| 4,958,843 | A | * | 9/1990 | Cole ..................... B62B 7/00 |
| | | | | 280/30 |
| 5,957,482 | A | * | 9/1999 | Shorter ................ B62B 3/007 |
| | | | | 280/47.35 |
| 6,641,149 | B2 | * | 11/2003 | Chiappetta ............. B62B 3/007 |
| | | | | 280/87.01 |
| 7,222,866 | B1 | | 5/2007 | Cahoj et al. |
| 8,523,193 | B1 | | 9/2013 | Mucaro et al. |
| 2005/0188970 | A1 | | 9/2005 | Cuisinier |
| 2007/0144505 | A1 | * | 6/2007 | McCallister ....... A63B 21/0552 |
| | | | | 473/451 |
| 2016/0003573 | A1 | | 1/2016 | Johnston |

* cited by examiner

WAGON AND CATAPULT ASSEMBLY

CROSS-REFERENCE TO RELATED APPLICATIONS

This application claims priority from U.S. Provisional Application Ser. No. 63/176,957, entitled "Wagon and Catapult Assembly", filed on Apr. 20, 2021, which application is hereby incorporated herein by reference in its entirety.

FIELD OF THE INVENTION

The present invention relates generally to a toy wagon assembly. More so, the present invention relates to a toy wagon and catapult assembly.

BACKGROUND OF THE INVENTION

As a recreational tool, toy wagons have long been known in the art, the wagon has been used by children to store and haul a variety of items. The traditional toy wagon includes a wagon body, four wheels, and a tow handle operable for towing a variety of items.

Further, the development of the slingshot/catapult is one which has been evolving for many years. The first such device was simply a handheld yoke to which was attached an elastic material and a small pouch to hold a missile/projectile. Further a variety of water balloon launching devices have been described in the prior art, which are effective at hurling a water balloon farther than a kid would naturally throw. Further, many toy water balloon launchers are big enough to be held by a kid.

Numerous attempts have been made and several prior art devices are known for variety of toy wagon assemblies. Even though these innovations may be suitable for the specific purposes to which they address, however, they would not be as suitable for the purposes of the present invention.

For example, U.S. Pat. No. 651,658 to Flindall discloses a toy vehicle combining a wagon and hobbyhorse which can be operated by a child riding thereon, wherein the hobbyhorse is mounted with its hind legs on the rock shaft in a rearing attitude and provided with flexible pull-straps, the toy vehicle can be kept up in motion as long as desired by alternately pulling and relaxing the pull-straps.

U.S. Pat. No. 1,223,949 to Flagg relates to a toy or play wagon wherein the toy wagon moves by providing a rolling and pitching motion to the body of the vehicle for simulating the action of a boat on a rough sea.

U.S. Pat. No. 4,922,884 to Ford describes a handheld catapult, of slingshot design comprising an enlarged projectile pouch and large clearance of the yoke, which is conceived to catapult a large projectile such as water balloons and baseball.

U.S. Pat. No. 7,222,866 to Cahoj et al. teaches a child's wagon that resembles an animal, such as a horse, that can be ridden by a child while storing a plurality of toys and necessary supplies for the child inside the wagon. The wagon may be pulled from one location to another using a tongue or a tow bar in a conventional fashion.

U.S. Pat. No. 8,523,193 to Mucaro et al. discloses a convertible ride-on toy wagon comprising a wagon body having a compartment therein for storage. A handle pivotally connected with the seat member of the toy to pulls the toy into motion.

U.S. Pat. Application No. 2005/0188970 to Cuisinier relates to a toy water balloon launcher comprising a shaft and a slit designed to receive water balloons. A user then swings the entire water balloon launcher. The resulting force pulls the water balloon from the slit and toward a target.

U.S. Pat. Application No. US 2016/0003573 to Johnston discloses a vehicle mounted slingshot frame wherein the slingshot frame mounted to the trailer hitch receiver on a vehicle provides a slingshot that can be easily moved from place to place. The slingshot can be used for recreational purposes, agricultural purposes including throwing water balloons, shooting targets or bundles could be launched to create feed plots, distribute pesticides or the like.

It is apparent now that numerous innovations that are adapted to a variety of toy wagon and a variety of catapult/slingshot assembly have been developed in the prior art that are adequate for various purposes. Furthermore, even though these innovations may be suitable for the specific purposes to which they address, accordingly, they would not be suitable for the purposes of the present invention as heretofore described. Thus, a toy wagon with a catapult/slingshot assembly mounted to the toy wagon is needed.

SUMMARY OF THE INVENTION

The present invention relates generally to a wagon and catapult assembly. Wherein the assembly comprises a toy wagon that carries a detachable catapult, while allowing one or more children to ride in the toy wagon while also operating the catapult; whereby the toy wagon allows the children to launch projectiles from the catapult while in a sitting or in a prone position on the toy wagon, or while standing and operating the toy wagon.

According to one aspect of a wagon and catapult assembly, the assembly comprises a toy wagon, wherein the wagon comprises a foldable body portion, a mobile portion attached to bottom side of the body portion, at least one seat detachably attached to top side of the body portion; a catapult portion comprising a catapult and an elongated leg, wherein a catapult is fixed attached to the elongated leg, further the elongated leg is detachably mounted at a desirable angle of between 35 and 65 degrees, optimally about 45 degrees, on the body portion; and an elongated handle, wherein the handle detachably attached to one end of the body portion; whereby the elongated handle is configured to stabilize the assembly while operating the catapult portion to fire a projectile at a desired angle of between 35 and 65 degrees.

In another aspect, the body portion is about 48 inch long.

In another aspect, the handle is about 36 inch long.

In another aspect, the projectile comprises a water balloon.

In another aspect, the mobile portion comprises four wheels.

In another aspect, the leg depressions define a semi-circular shape.

One objective of the present invention is to provide a toy wagon that can be easily transformed into a mobile platform for launching projectiles.

Another objective is to enable easy stowage with a foldable body portion 102, and detachable front sidewalls.

Yet another objective is to provide leg depressions that allow the child to sit inside the wagon while operating the catapult.

Yet another objective is to enable easy detachment of the seat and position the seat for facilitating operation of the catapult form a sitting position.

Yet another objective is to provide a durable toy wagon and catapult toy detachably mounted to the wagon.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
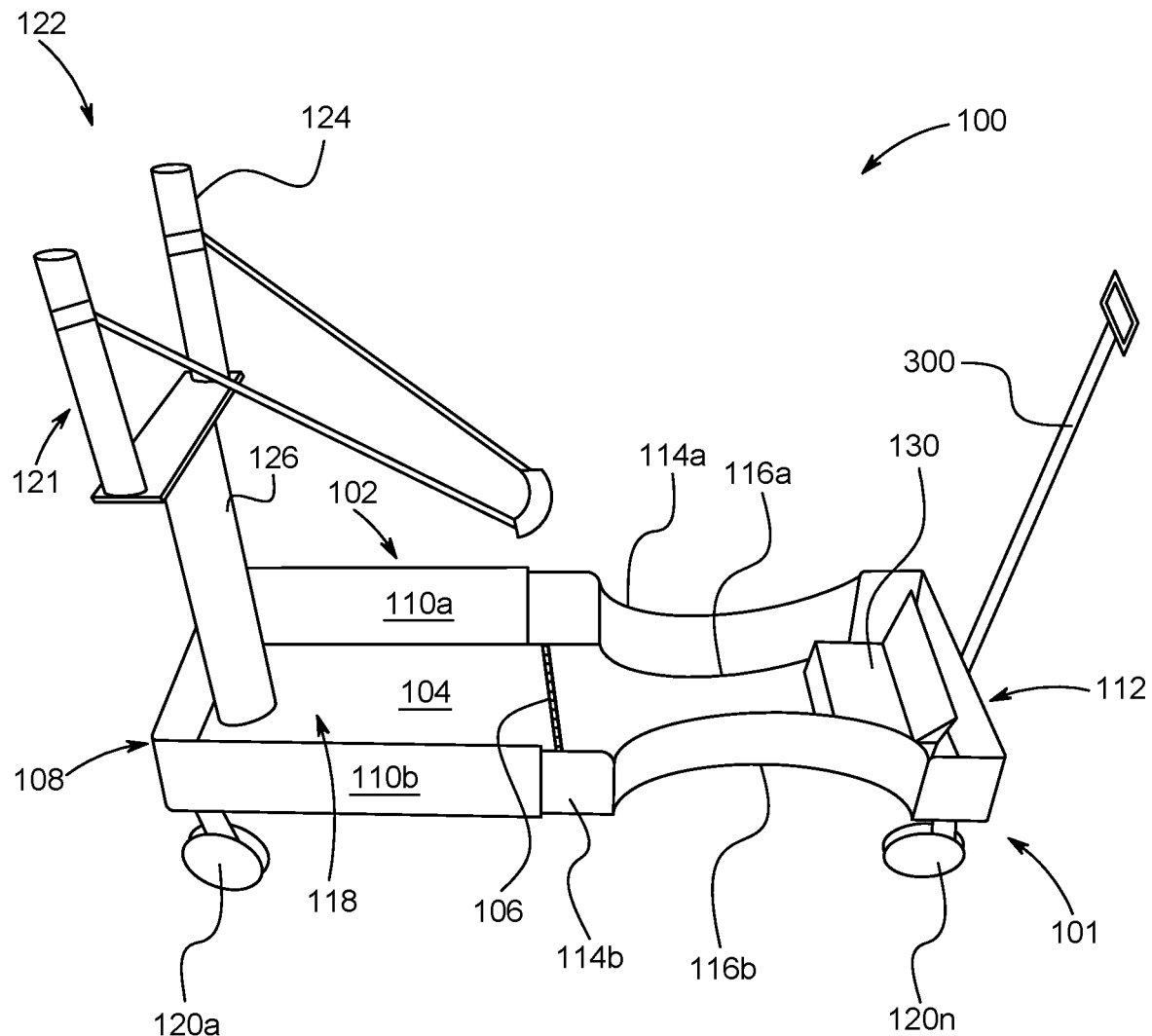
FIG. 1 illustrates a perspective view of an exemplary wagon and catapult assembly, showing the catapult portion coupled to the body portion, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

A wagon and catapult assembly 100 is referenced in FIGS. 1-4. The wagon and catapult assembly 100, hereafter "assembly 100" provides a dual-action toy for children comprising a toy wagon 101 that carries a detachable catapult portion 122. In this unique toy adaptation of the traditional toy wagon 101, one or more children can ride, propel, and glide on the toy wagon 101, while also operating a catapult portion 122. Or the children can simply operate the catapult portion 122 and use the toy wagon 101 as a mobile platform for aiming and guiding projectiles 400 towards a target. Additionally, the toy wagon 101 can be configured to enable the children to launch projectiles 400 from the catapult portion 122 while in a sitting or prone position on the toy wagon 101; or while standing and operating the toy wagon 101. The projectile 400 can be a water balloon, a toy, a ball, food for animals, a fire extinguisher packet, seed balls or the like without departing from the scope and spirit of the present invention.

In some embodiments, the toy wagon 101 includes a body portion 102 that serves as an independent tray structure for the wagon toy unto itself, and/or a mobile platform attached to the tray structure for providing motion to the body portion for operating the catapult portion 122 while in motion or stationary. The body portion 102 defines an inner usable space 118 for carrying one or more children, or objects. The body includes a floor wall 104 for the child to rest on. The floor wall 104 forms a fold crease 106 disposed approximately halfway along the length of the body portion 102 that enables the toy wagon 101 to fold for stowage. The body portion 102 also has a front end 112 with front sidewalls 114a-b, and a rear end 108 with rear sidewalls 110a-b.

In some embodiments, the rear sidewalls 110a-b are fixed. And the detachable front sidewalls 114a-b defined around a pair of leg depressions 116a-b that enable the child to sit in a prone position while launching projectiles 400 from a catapult 121 or riding the toy wagon 101. The front sidewalls 114a-b can be detached, so that the child can sit while hanging his legs down from the floor wall 104 of the body portion 102. Further the front end 112 is slightly narrower that the rear end 108, so that the wagon 101 can be folded along a fold crease 106 when not in use or in a stowed position. An elongated handle 300 extends from the front end 112 for manipulating the toy wagon 101 and providing stability while operating the catapult 121 of the catapult portion 122. A seat detachably couples to the floor wall 104, at the front end 112 of the body portion 102. A pair of axles carries a mobile portion 120a-n, such as wheels, rollers, or sleds, which allow the toy wagon 101 to be mobile.

One aspect of a wagon and catapult assembly 100, comprises a toy wagon 101, wherein the wagon 101 comprises a foldable body portion 102, a mobile portion 120a-n attached to bottom side of the floor wall 104 of the body portion 102, at least one seat 130 detachably attached to top side of the floor wall 104 and an elongated handle 300 detachably attached to one end of the body portion 102; whereby the elongated handle 300 is configured to stabilize and provide about 105 degrees or flat on the ground desired angle to the assembly 100; and a catapult portion 122 comprising a catapult 121 and an elongated leg 126, wherein a catapult 121 is fixed attached to the elongated leg 126, further the elongated leg 126 is detachably mounted at 90 degrees relative to the body portion 102:

According to another aspect, wherein the body portion 102 comprises a floor wall 104, the floor wall 104 defining a fold crease 106 disposed approximately halfway along the length of the body portion 102 of the wagon 101, whereby the body portion 102 folds.

According to another aspect, wherein one or more rear sidewalls 110a-b are fixedly joined with the floor wall 104 at rear end 108 of the body portion 102.

According to another aspect, wherein one or more front side walls 114a-b are detachably joined with the floor wall 104 at front end 112 of the body portion 102, whereby the front sidewalls 114a-b are detachably mounted along a pair of leg depressions 116a-b.

According to another aspect, wherein the floor wall 104 and the sidewalls (110a-b and 114a-b) define a usable space 118.

According to another aspect, wherein the elongated handle 300 defined by a distal end 302a and a proximal end 302b, the distal end 302a hingedly joined with the front end 112 of the body portion 102, the proximal end 302b enabling operation of the body portion 102.

According to another aspect, wherein the seat 130 is detachably coupled to the floor wall 104, at the front end 112 of the body portion 102.

According to another aspect, wherein the mobile portion 120a-n comprises a pair of axles and four wheels.

According to another aspect, wherein the catapult 121 comprising a yoke 124; an elastic member 125 having two ends that fixedly join with the yoke 124 to launch a projectile 400, and the elongated leg 126 extending perpendicular from the yoke 124, whereby the leg 126 defining a mount end 128a and a yoke end 128b, the mount end 128a configured to detachably couple to a mount provision 127 (FIG. 3) the rear end 108 at the floor wall 104, the yoke end 128b fixedly joined to the yoke 124.

According to another aspect of a wagon and catapult assembly 100, comprises: a body portion 102 having: a floor wall 104, the floor wall 104 defining a fold crease 106 disposed approximately halfway along the length of the body portion 102, whereby the body portion 102 folds; a rear end 108 comprising rear sidewalls 110a-b, the rear sidewalls 110a-b fixedly joined with the floor wall 104; a front end 112 comprising front sidewalls 114a-b, the front sidewalls 114a-b detachably joined with the floor wall 104, the front sidewalls 114a-b are detachably mounted along a pair of leg depressions 116a-b, whereby the floor wall 104 and the sidewalls define a usable space 118 of the body portion; an elongated handle 300 defined by a distal end 302a and a proximal end 302b, the distal end 302a hingedly joined with the front end 112 of the body portion, the proximal end 302b enabling operation of the body portion 102; a seat 130 detachably coupled to the floor wall 104, at the front end 112 of the body portion 102; a pair of axles carrying a mobile portion 120a-n, the mobile portion 120a-n operable to enable mobility of the body portion 102; a catapult portion 122 comprising: a yoke 124; an elastic member 125 having two ends that fixedly join with the yoke, whereby the elastic member 125 launches a projectile 400; and a leg 126 extending perpendicular from the yoke 124, the leg 126 defining a mount end 128a and a yoke end 128b, the mount end 128a configured to detachably couple to the rear end 108 at the floor wall 104, the yoke end 128b fixedly joined to the yoke 124, whereby the handle 300 stabilizes the body portion 102 while operating the catapult portion 122.

In another aspect, the body portion 102 is about 48 inch long.

In another aspect, the body portion 102 is about 18 inch high.

In another aspect, the handle 300 is about 36 inch long.

In another aspect, the projectile 400 comprises a water balloon.

In another aspect, the mobile portion 120a-n comprises four wheels.

In another aspect, the leg depressions 116a-b define a semi-circular shape.

In another aspect, the fold crease comprises a piano hinge.

In another aspect, the wagon 101 comprises a pair of detachable footrest attached below the pair of leg depressions 116a-b.

In another aspect, the wagon 101 comprises a storage area such as a basket to store projectiles.

In another aspect, the projectile 400 is selected from a group comprising a water balloon, a toy, a ball, food for animals, a fire extinguisher packet, seed balls.

FIG. 1 illustrates a body portion 102 and the mobile portion 120a-n configured as a toy wagon 101 of the assembly 100. The toy wagon 101 may have a generally rectangular shape (tray shape) that allows multiple children to ride inside. The toy wagon 101 can be pulled, pushed, turned, glided down a hillside by an elongated handle 300; and in an exemplary embodiment the wagon 101 or the like in a unique configuration may be used as a mobile platform for launching projectiles 400. In one non-limiting embodiment, the body portion 102 is about 48 inch long. The body portion 102 may also be 18 inch high. The body portion 102 is, however, scalable, so as to allow for larger and smaller sizes of the toy wagon 101.

Figure 2:
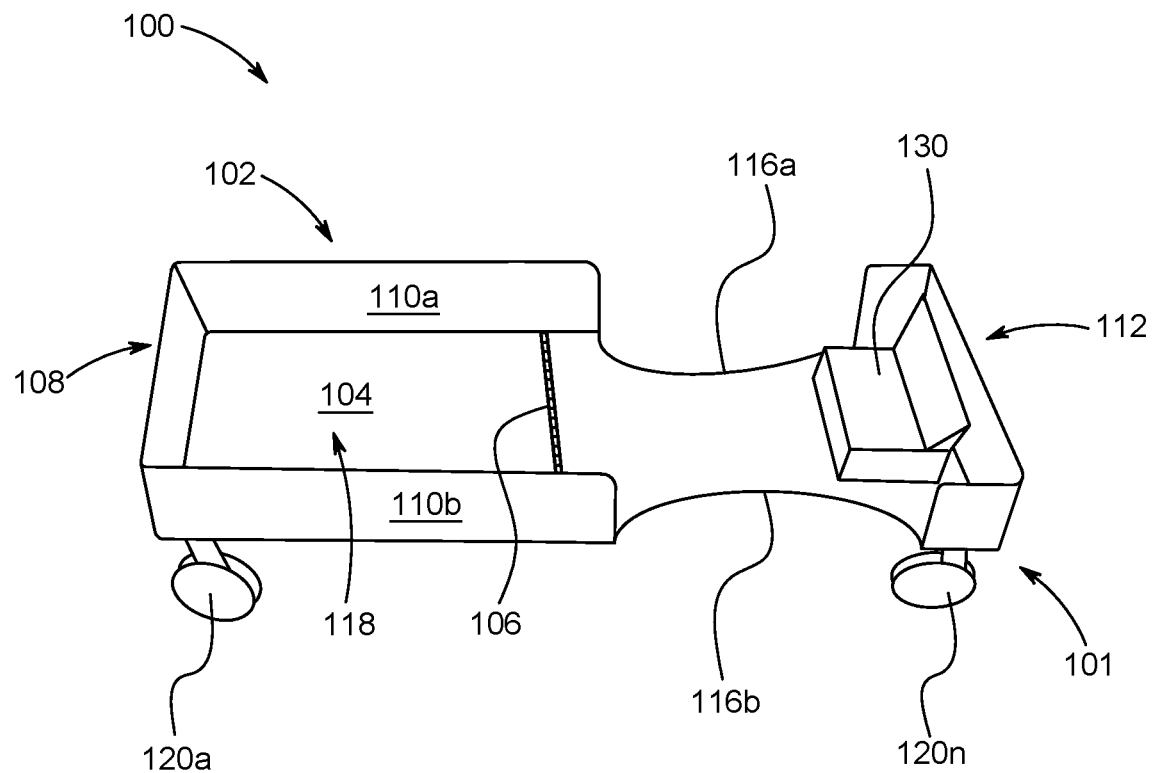
FIG. 2 illustrates a perspective view of the wagon of the assembly shown in FIG. 1, where the catapult portion is removed from the body portion, in accordance with an embodiment of the present invention.
Figure 3:
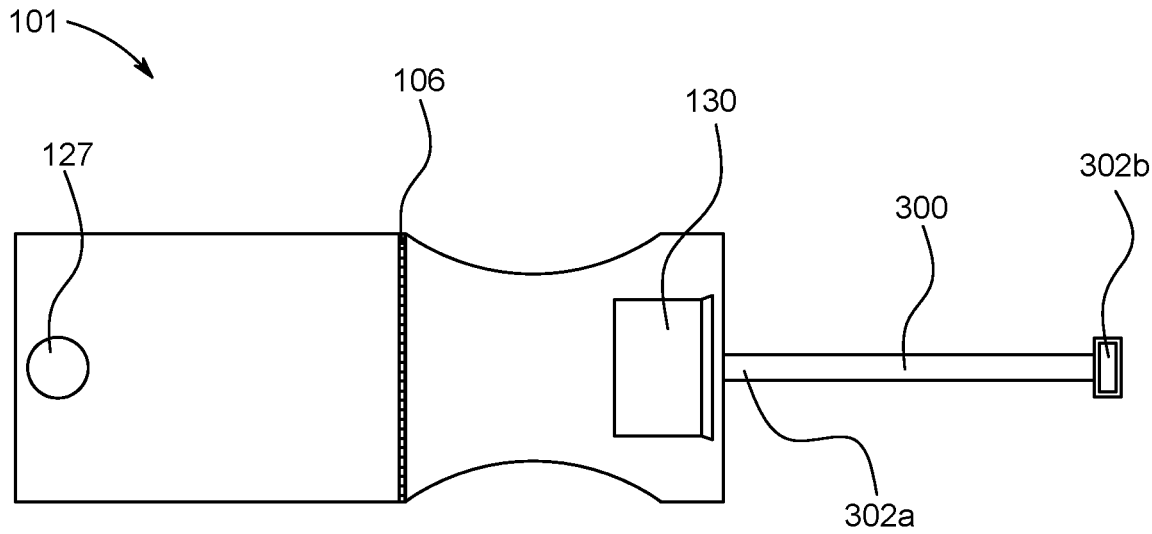
FIG. 3 illustrates a blow-up view of the wagon and catapult assembly, in accordance with an embodiment of the present invention.
Figure 3:
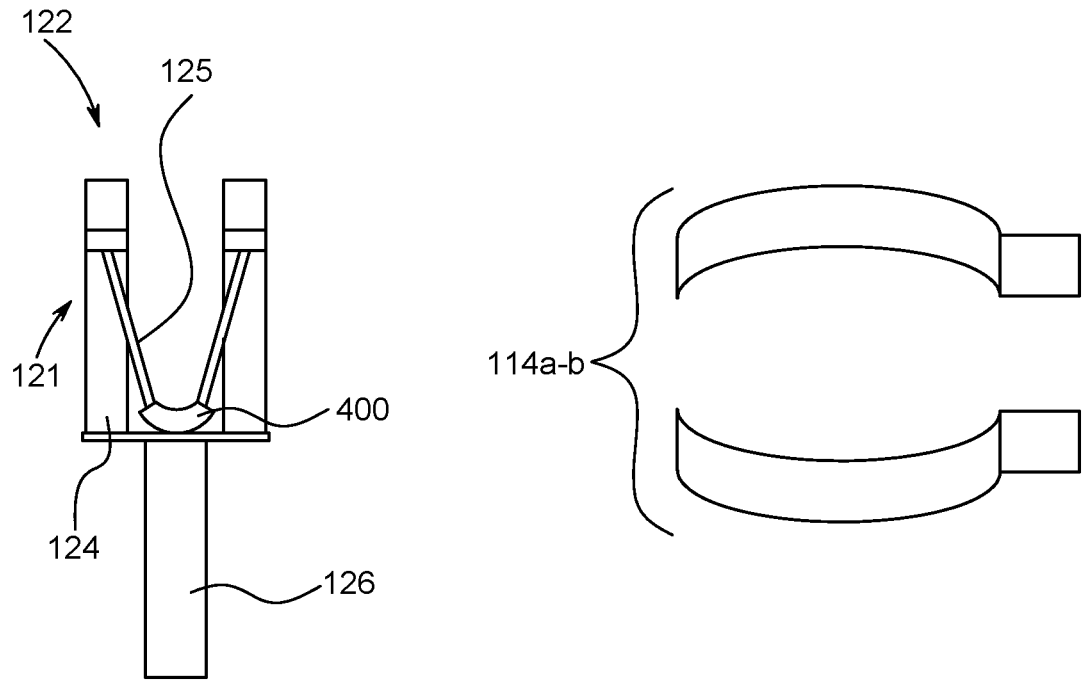

Turning now to FIG. 2, the body portion 102 may comprise a floor wall 104 that serves as the foundation for the child to sit, stand, or lie on the body portion 102. The floor wall 104 is generally horizontal and planar in nature. In alternative embodiments, the floor wall 104 defines a fold crease 106. The fold crease 106 may be a piano hinge, or other hinging mechanism that enables the body portion 102 to fold along the length of the body portion 102. In one embodiment, the fold crease 106 is disposed approximately halfway along the length of the body portion 102. The fold crease 106 enables the body portion 102 to fold in half for easy stowage. In other embodiments, the fold crease 106 is not directly at the center of the body portion 102, but more proximal to the front or rear end 108s thereof. In another exemplary embodiment the body portion 102 can be folded along the width of the body portion 102. Further the body portion can be slidably squeezed or expanded to fold and unfold the of the body portion 102.

In some embodiments, the body portion 102 includes a rear end 108 oriented in the rear direction of motion. The rear end 108 comprises rear sidewalls 110a-b that extends upwardly at an orthogonal to the floor wall 104. The rear sidewalls 110a-b detachably join with the floor wall 104. In this manner, the body portion 102 can be stowed more easily, and the legs of the child can overlap the floor wall 104, such as when operating the catapult portion 122.

As FIGS. 1 and 2 show, the body portion 102 includes a front end 112, oriented oppositely the rear end 108. The front end 112 comprises a pair of front sidewalls 114a-b that are detachably joined with the floor wall 104. The front sidewalls 114a-b are mounted along a pair of leg depressions 116a-b that enable the child to sit on the floor wall 104 with the legs hanging over the front sidewalls 114a-b. This can be advantageous for carrying multiple children, or when operating the catapult portion 122 directly from the toy wagon 101. In one non-limiting embodiment, the leg depressions 116a-b define a semi-circular shape. Furthermore, the floor wall 104 and the sidewalls define a usable space 118 that is sized and dimensioned to enable one or more children to stand or sit in the body portion 102 while operating the toy wagon 101 and/or the catapult portion 122 as shown in a blow-up view of the wagon and catapult assembly 100, in FIG. 3 in accordance with an embodiment of the present invention.

The assembly 100 also includes an elongated handle 300 that extends from the front end 112 of the body portion 102.

The handle 300 is configured for manipulating the toy wagon 101 and stabilizing the catapult portion 122 during use. The handle 300 is defined by a distal end 302a and a proximal end 302b. The distal end 302a is hingedly joined with the front end 112 of the body portion 102. The proximal end 302b may have a handle 300 that enables operation of the body portion 102. For example, the child can pull the handle 300 to propel the toy wagon 101 in a forward/backward direction. Or the child can hold the handle 300 while firing projectiles 400 to steady or aim the body portion 102. In one non-limiting embodiment, wherein the handle 300 is about 36 inch long.

Figure 4:
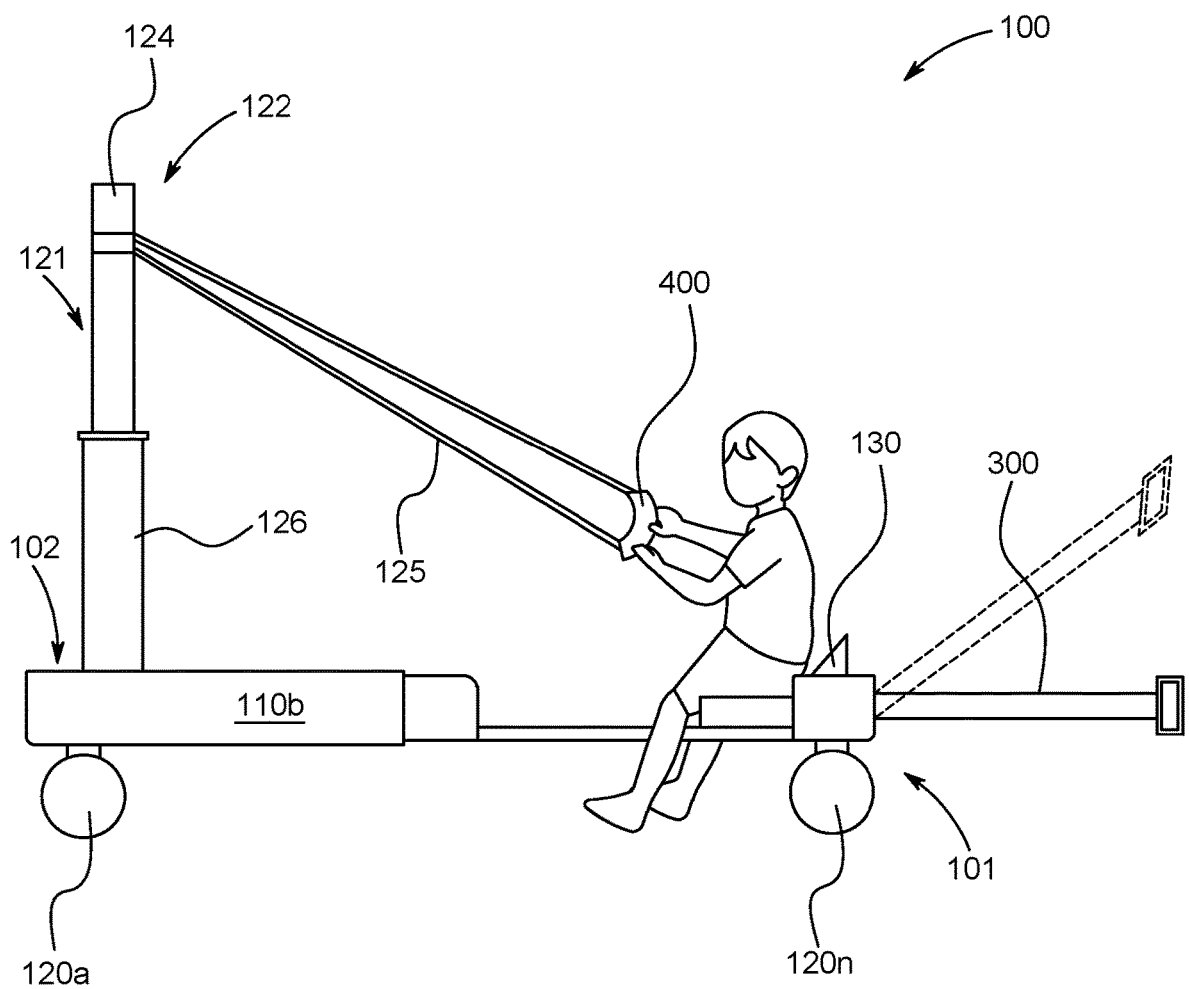
FIG. 4 illustrates a side view of the wagon and catapult assembly, showing a child operating the catapult portion while sitting on the body portion, in accordance with an embodiment of the present invention.

In another possible embodiment, a seat 130 detachably couples to the floor wall 104, at or near the front end 112 of the body portion 102. The seat 130 provides an elevated position on the floor wall 104 for the child to sit while riding the toy wagon 101, or while operating the catapult portion 122, as shown in FIG. 4. The seat 130 may be a simple plastic seat 130 or the like, as is known in the art of toy wagons. The seat 130 may attach to the floor wall 104 through a fastener, a snap-fit relationship, a bore hole, a magnet, combination thereof or the like without departing from the scope and spirit of the present invention.

In some embodiments, the assembly 100 also includes a pair of axles that extend transversely across the body portion 102 in a spaced-apart parallel relationship. The axles are configured to carry a mobile portion 120a-n. The mobile portion 120a-n enables the body portion 102 to be mobile, with or without catapult portion 122 attached thereto. In one non-limiting embodiment, the mobile portion 120a-n comprises four wheels. In other embodiments, rollers, skids, or any number of wheels may also be used.

In one embodiment, the assembly 100 also includes a catapult portion 122 that is used to fire a projectile directly from the body portion 102. For example, FIG. 4 illustrates a side view of the wagon and catapult assembly 100, showing a child operating the catapult portion 122 while sitting at the usable space 118 of the body portion 102. The catapult portion 122 is unique in being detachable from the body portion 102 when not in use. The catapult portion 122 comprises a yoke 124. Working in relation with the yoke 124 is an elastic member 125 having two ends that fixedly join with the yoke. The elastic member 125 may include a rubber band that launches a projectile 400. In one non-limiting embodiment, the projectile 400 is a water balloon. The elastic member 125 may, however, also launch other toys or projectiles or the like.

Continuing with the catapult portion 122, a leg 126 extends perpendicular from the yoke. The leg 126 defines a mount end 128a and an opposing yoke end 128b. The mount end 128a is configured to detachably couple inside a hole or mounting surface in the floor wall 104, at the rear end 108 of body portion 102. The yoke end 128b fixedly joins to the yoke 124. When operating the catapult portion 122, the handle 300 stabilizes the body portion 102. The handle 300 can also be used to aim the body portion 102 in a specific direction so that the catapult portion 122 strikes the intended target.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A wagon and catapult assembly, the assembly comprising:
   a toy wagon, wherein the wagon comprises a foldable body portion, a mobile portion attached to a bottom side of the body portion, at least one seat detachably attached to a top side of the body portion;
   a catapult portion comprising a catapult and an elongated leg, wherein the catapult is attached to the elongated leg, further the elongated leg is detachably mounted on the body portion; and
   an elongated handle, wherein the handle is detachably attached to one end of the body portion; whereby the elongated handle is configured to stabilize the assembly while operating the catapult portion to fire a projectile at an angle of between 35 degrees and 65 degrees,
   wherein the body portion comprises a floor wall, the floor wall defining a fold crease disposed approximately halfway along a length of the body portion of the wagon, whereby the body portion folds,
   wherein one or more front side walls are detachably joined with the floor wall at a front end of the body portion, whereby the front sidewalls are defined along a pair of leg depressions.

2. The assembly of claim 1, wherein one or more rear sidewalls are fixedly joined with the floor wall at a rear end of the body portion.

3. The assembly of claim 1, wherein the elongated handle is configured to allow the catapult assembly to fire a projectile at an angle of about 45 degrees.

4. The assembly of claim 1, wherein the elongated handle is defined by a distal end and a proximal end, the distal end hingedly joined with the front end of the body portion, the proximal end enabling operation of the body portion.

5. The assembly of claim 1, wherein the seat is detachably coupled to the floor wall, at the front end of the body portion.

6. The assembly of claim 1, wherein the mobile portion comprises a pair of axles and four wheels.

7. The assembly of claim 1, wherein the catapult comprising a yoke; an elastic member having two ends that fixedly join with the yoke to launch a projectile, and the elongated leg extending perpendicular from the yoke, whereby the elongated leg defining a mount end and a yoke end, the mount end configured to detachably couple to a rear end at the floor wall, the yoke end fixedly joined to the yoke.

8. A wagon and catapult assembly, the assembly comprising:
   a body portion comprising:
      a floor wall, the floor wall defining a fold crease disposed approximately halfway along a length of the body portion, whereby the body portion folds;
      a rear end comprising rear sidewalls, the rear sidewalls fixedly joined with the floor wall;
      a front end comprising front sidewalls, the front sidewalls detachably joined with the floor wall, the front sidewalls are defined along a pair of leg depressions, whereby the floor wall and the sidewalls define a usable space of the body portion;
   an elongated handle defined by a distal end and a proximal end, the distal end hingedly joined with the front end of the body portion, the proximal end enabling operation of the body portion;
   a seat detachably coupled to the floor wall, at the front end of the body portion;

a pair of axles carrying a mobile portion, the mobile portion operable to enable mobility of the body portion;
a catapult portion comprising:
a yoke;
an elastic member having two ends that fixedly join with the yoke, whereby the elastic member launches a projectile; and
a leg extending perpendicular from the yoke, the leg defining a mount end and a yoke end, the mount end configured to detachably couple to the rear end at the floor wall, the yoke end fixedly joined to the yoke,
whereby the handle stabilizes the body portion while operating the catapult portion.

9. The assembly of claim 8, wherein the body portion is about 48 inches long and 18 inches high.

10. The assembly of claim 8, wherein the handle is about 36 inches long.

11. The assembly of claim 8, wherein the fold crease comprises a piano hinge.

12. The assembly of claim 8, wherein the mobile portion comprises four wheels.

13. The assembly of claim 8, wherein the leg depressions define a semi-circular shape.

\* \* \* \* \*